(12) United States Patent
Okamoto et al.

(10) Patent No.: US 8,402,483 B2
(45) Date of Patent: Mar. 19, 2013

(54) TELEVISION BROADCASTING RECEIVING APPARATUS

(75) Inventors: Kenji Okamoto, Daito (JP); Kosuke Kinoshita, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 872 days.

(21) Appl. No.: 11/924,046

(22) Filed: Oct. 25, 2007

(65) Prior Publication Data

US 2008/0104629 A1   May 1, 2008

(30) Foreign Application Priority Data

Oct. 26, 2006   (JP) ................................. 2006-291382

(51) Int. Cl.
  *H04N 7/16*   (2006.01)
(52) U.S. Cl. ................. 725/25; 725/27; 725/28; 725/29
(58) Field of Classification Search .............. 725/27–29, 725/25, 30–31
See application file for complete search history.

(56) References Cited

U.S. PATENT DOCUMENTS

| | | | | |
|---|---|---|---|---|
| 2004/0078830 A1* | 4/2004 | Onomatsu | ...................... | 725/135 |
| 2005/0283819 A1* | 12/2005 | Shimoji et al. | ................ | 725/142 |
| 2007/0064734 A1* | 3/2007 | Kim et al. | ...................... | 370/468 |
| 2007/0214472 A1* | 9/2007 | Kim et al. | ........................ | 725/28 |
| 2007/0220541 A1* | 9/2007 | Kim | ............................... | 725/28 |

FOREIGN PATENT DOCUMENTS

| | | |
|---|---|---|
| JP | 11-164221 A | 6/1999 |
| JP | 2000-152208 A | 5/2000 |
| JP | 2000-152239 A | 5/2000 |
| JP | 2001-145033 A | 5/2001 |
| JP | 2005-286424 A | 10/2005 |
| JP | 2006-166263 A | 6/2006 |

OTHER PUBLICATIONS

Japanese Office Action dated Nov. 18, 2008 w/English translation (four (4) pages).

* cited by examiner

*Primary Examiner* — James R Sheleheda
*Assistant Examiner* — Randy Flynn
(74) *Attorney, Agent, or Firm* — Crowell & Moring LLP

(57) ABSTRACT

Disclosed is a television broadcasting receiving apparatus which carries out a parental control based on rating information in a video/audio data included in a television broadcasting wave including a receiving unit to receive the television broadcasting wave, an auto preset unit to orderly tune channels in which a video/audio data of a program is viewable by scanning the television broadcasting wave, a rating table obtaining unit to obtain a rating table included in the television broadcasting wave when the channels in which the video/audio data of the program is viewable are orderly tuned by the auto preset unit, and a rating table storage unit to store the rating table obtained by the rating table obtaining unit.

4 Claims, 7 Drawing Sheets

| RRT NAME | XXX RATING | | |
|---|---|---|---|
| VERSION NO. | 12 | | |
| RATING ITEM | TV-AA | TV-BB | TV-CC |
| BLOCK TYPE | ORDER | CATEGORY | CATEGORY |
| LEVEL 0 | '''' / '''' | '''' / '''' | '''' / '''' |
| 1 | ZZZ / Z | TTT / T | JKF |
| 2 | YYY / Y | SSS / S | JJ |
| 3 | XXX / X | RRR / R | |
| 4 | WWW / W | QQQ / Q | |
| 5 | VVV / V | | |
| 6 | UUU / U | | |

FIG.3

| RRT NAME | | XXX RATING | | |
|---|---|---|---|---|
| VERSION NO. | | 12 | | |
| RATING ITEM | | TV-AA | TV-BB | TV-CC |
| BLOCK TYPE | | ORDER | CATEGORY | CATEGORY |
| LEVEL | 0 | '''' / '''' | '''' / '''' | '''' / '''' |
| | 1 | ZZZ / Z | TTT / T | JKF |
| | 2 | YYY / Y | SSS / S | JJ |
| | 3 | XXX / X | RRR / R | |
| | 4 | WWW / W | QQQ / Q | |
| | 5 | VVV / V | | |
| | 6 | UUU / U | | |

TELEVISION BROADCASTING RECEIVING APPARATUS

BACKGROUND OF THE INVENTION

1. Field of the Invention

The present invention relates to a television broadcasting receiving apparatus.

2. Description of Related Art

Conventionally, there is known a television broadcasting receiving apparatus in which information (rating information) of a parental control level is added to a video/audio data of a program in the broadcasting station side, and which restricts the viewing of the program based on the rating information so that children will not watch the programs which include violent expressions and the programs which include indecent expressions (for example, see JP2006-166263A and JP2000-152208A). Further, there is known a television broadcasting recording apparatus which generates and sets the parental control information separately from the rating information by the combinations of channel number, time zone, genre and the like and which restricts the viewing, the storing and the replaying of the program based on the parental control information (for example, see JP2001-145033A). Moreover, there is known a television broadcasting receiving apparatus which can view a program to which the parental control is set by inputting a preset pin number (for example, JP11-164221A).

The RRT (Rating Region Table) will be newly transmitted by being added to the broadcasting data as a rating table different from the conventional rating table. Therefore, it is obligated to include a function which can set the parental control information to the television broadcasting receiving apparatus based on the RRT.

Usually, the parental control information is set based on the rating information added to the broadcasting data of the program while viewing the program. However, when the program is being viewed for the first time in the television broadcasting receiving apparatus, there is a case where the parental control information cannot be set immediately when the RRT is not received because the RRT is transmitted every certain time such as 60 seconds or the like.

The inventions disclosed in the above mentioned JP2006-166263A, JP2000-152208A, JP2001-145033A, and JP11-164221A, cannot solve the problem because they are the television broadcasting accepting apparatuses and a television broadcasting recording apparatus which set the parental control information while viewing the program.

SUMMARY OF THE INVENTION

It is, therefore, a main object of the present invention to provide a television broadcasting receiving apparatus which can surely set the parental control information even when the program is viewed for the first time.

According to a first aspect of the present invention, there is provided a television broadcasting receiving apparatus which carries out a parental control based on rating information in a video/audio data included in a television broadcasting wave comprises a receiving unit to receive the television broadcasting wave, an auto preset unit to orderly tune channels in which a video/audio data of a program is viewable by scanning the television broadcasting wave, a rating table obtaining unit to obtain a rating table included in the television broadcasting wave when the channels in which the video/audio data of the program is viewable are orderly tuned by the auto preset unit, a rating table storage unit to store the rating table obtained by the rating table obtaining unit, a completion information storage unit to store rating table obtaining completion information which indicates that the rating table is obtained by the rating table obtaining unit and stored in the rating table storage unit, a display control unit to display rating information based on the rating table stored in the rating table storage unit on the display unit and an input unit to input setting information to set parental control information based on the rating information displayed on the display unit, and the rating table obtaining unit determines whether the rating table obtaining completion information is stored in the completion information storage unit or not when the channels including the video/audio data of the program are orderly tuned by the auto preset unit, and obtains the rating table included in the television broadcasting wave only when it is determined that the rating table obtaining completion information is not stored in the completion information storage unit.

According to a second aspect of the present invention, there is provided a television broadcasting receiving apparatus which carries out a parental control based on rating information in a video/audio data included in a television broadcasting wave comprises a receiving unit to receive the television broadcasting wave, an auto preset unit to orderly tune channels in which a video/audio data of a program is viewable by scanning the television broadcasting wave, a rating table obtaining unit to obtain a rating table included in the television broadcasting wave when the channels in which the video/audio data of the program is viewable are orderly tuned by the auto preset unit and a rating table storage unit to store the rating table obtained by the rating table obtaining unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 is a diagram explaining an example of a RRT according to the present invention;

DESCRIPTION OF THE PREFERRED EMBODIMENTS

Hereinafter, the best mode for implementing a television broadcasting receiving apparatus according to the present invention will be described in detail with reference to the drawings.

First Embodiment

Figure 1:
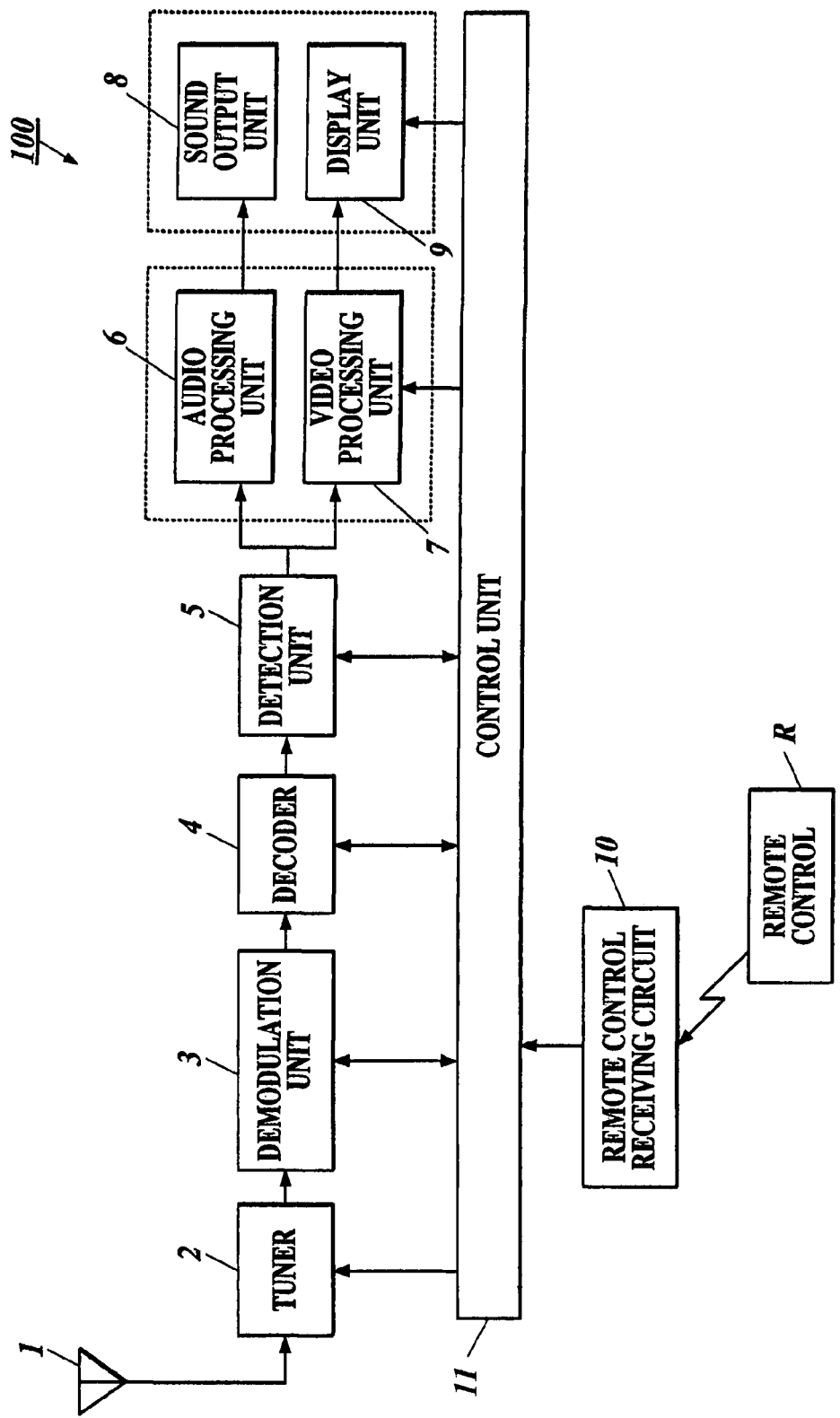
FIG. 1 is a diagram showing a schematic structure of a television broadcasting receiving apparatus according to the first embodiment of the present invention.
Figure 2:
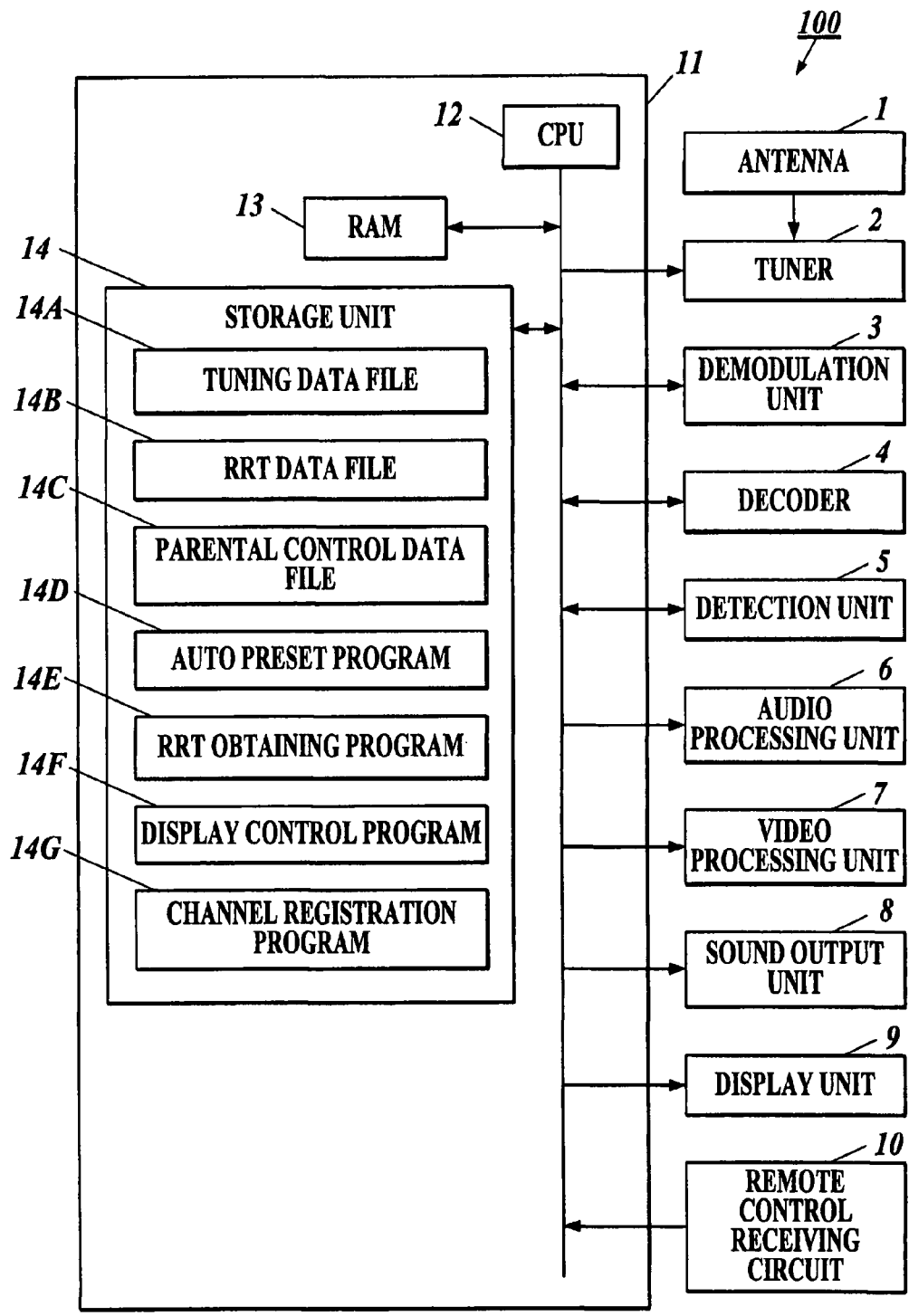
FIG. 2 is a block diagram showing a structure of the television broadcasting apparatus according to the first embodiment of the present invention.

First, the structure of a television broadcasting receiving apparatus 100 according to the first embodiment of the present invention will be described with reference to FIGS. 1 and 2. For example, the television broadcasting receiving apparatus 100 according to the present embodiment comprises an antenna 1, a tuner 2, a demodulation unit 3, a decoder 4, a detection unit 5, an audio processing unit 6, a video processing unit 7, a sound output unit 8, a display unit 9, a remote control receiving circuit 10, a remote control R, a control unit 11 and the like as shown in FIGS. 1 and 2.

For example, the antenna 1 is the parabola antenna, the UHF antenna or the like. The antenna 1 receives a broadcasting wave including television broadcasting signals such as terrestrial analog broadcasting, terrestrial digital broadcasting, BS/CS broadcasting and the like, and outputs RF signals such of terrestrial analog signal, a terrestrial digital signal, a BS/CS broadcasting signal and the like to the tuner 2. Thereby, the antenna 1 functions as a receiving unit. Here, when the broadcasting wave is received via the CATV circuit, a connection cable (omitted from the drawing) or the like may be provided.

The tuner 2 comprises a mixer (omitted from the drawing) a tuning circuit (omitted from the drawing), an A/D converter (omitted from the drawing) and the like. The RF signal which is input from the antenna 1 is converted to an IF (Intermediate Frequency) signal of a channel which is requested by a user by the mixer, the tuning circuit or the like, and the generated IF signal is converted to a digital data by the A/D converter.

For example, the demodulation unit 3 carries out the demodulation process or the like to the digital data which is input from the tuner 2 and outputs the processed digital data to the decoder 4.

For example, the decoder 4 generates the video/audio data (video data and audio data) and the rating information of the program by carrying out the demodulation process or the like for the digital data which is input from the demodulation unit 3, and outputs the generated video/audio data and the rating information of the program to the detection unit 5. Here, the rating information is information regarding the parental control level of the program.

More particularly, for example, there is known a rating information defined by the MPAA (Motion Picture Association of America), a rating information defined by the TV Parental Guidelines and the like as the conventional rating information. Further, for example, there are rating information which indicated the parental control level of each program by age and rating information which indicates the parental control level of each program by the content of the program among the conventional rating information.

As the rating information specific to digital broadcasting (for example, the V-Chip 2.0 in the U.S.), a rating table is newly established. As a rating table, there is the RRT (Rating Region Table), for example. Differently from the conventional rating information, the RRT indicates the parental control level of each program according to the rating items which is defined by genre or the like of the program (for example, genre such as news, movie or the like) and the rating level which is set for each rating item, for example, as shown in FIG. 3.

Moreover, in the RRT, a method (block type) of carrying out the parental control is defined for each rating item. When the block type is an order method, the parental control is carried out for all the levels above the assigned rating level, and when the block type is a category method, the parental control is carried out only for the assigned rating level. Further, for example, when the block type is the order method, the rating level is same as the rating level indicated by age which is used in the conventional analog broadcasting. Furthermore, for example, when the block type is the category method, the rating level is same as the rating level indicated by the content of the program which is used in the conventional analog broadcasting.

For example, the RRT is identified by the RRT name and the version number (version No. in FIG. 3) because the RRT is updated in each broadcasting station.

The detection unit 5 detects the rating information from the demodulated data which is output from the decoder 4 by being controlled by the control signal input from the control unit 11.

For example, the audio processing unit 6 comprises a mute circuit (omitted from the drawing) and the like, and carries out the mute processing or the like for the audio data which is output from the decoder 4 by being controlled by the control signal input from the control unit 11.

For example, the video processing unit 7 comprises a mute circuit (omitted from the drawing) and the like, and carries out the mute processing or the like for the video data which is output from the decoder 4 by being controlled by the control signal input from the control unit 11. Further, for example, the video processing unit 7 combines the OSD display data for displaying the rating information on the display unit 9 to the video data which is output from the decoder 4 by being controlled by the control signal input from the control unit 11.

For example, the audio output unit 8 comprises a speaker or the like, and outputs the audio based on the audio data which is output from the audio processing unit 6.

For example, the display unit 9 comprises the LCD (Liquid Crystal Display), the PDP (Plasma Display Panel) or the like, and displays the video based on the video data which is output from the video processing unit 7.

For example, the remote control receiving circuit 10 outputs the operation signal which is output from the remote control R to the control unit 11. More particularly, the remote control receiving circuit 10 converts the infrared signal from the remote control R to the electric signal, and outputs the electric signal to the control unit 11.

For example, the remote control R comprises various types of keys or the like to input various types of operation signals, and outputs the various types of operation signals to the control unit 11 via the remote control receiving circuit 10 by the remote control R being operated by a user.

More particularly, for example, the remote control R functions as an input unit by inputting the setting information which sets the parental control information based on the rating information when the rating information is displayed on the display unit 9.

For example, the control unit 11 comprises a CPU (Central Processing Unit) 12, a RAM (Random Access Memory) 13, a storage unit 14 and the like as shown in FIG. 2.

For example, the CPU 12 controls the entire television broadcasting receiving apparatus 100 by reading the processing program or the like which are stored in the storage unit 14, expanding the processing program or the like in the RAM 13, and executing the processing program or the like.

The RAM 13 expands the processing program or the like which is executed by the CPU 12 in the program storage region in the RAM 13, and stores the input data and the processing results and the like which are generated when the above-mentioned processing programs are executed.

For example, the storage unit 14 comprises a recording medium (omitted from the drawing) in which the program, data and the like are stored in advance, and for example, the recording medium is constituted of a semiconductor memory or the like. Further, the storage unit 14 stores various types of data and various typed of processing programs to make the CPU 12 realize the function of controlling the entire television broadcasting receiving apparatus 100, the data and the like which are processed by the CPU 12 executing the programs. More particularly, for example, the storage unit 14 stores a tuning data file 14A, a RRT data file 14B, a parental control data file 14C, an auto preset program 14D, a RRT obtaining program 14E, a display control program 14F, a channel registration program 14G and the like as shown in FIG. 2.

For example, the tuning data file 14A stores the frequency and the channel number of the channels in which the video/audio data of the program is viewable which are tuned by the CPU 12 executing the auto preset program 14D.

For example, the RRT data file 14B stores the RRT as a rating table for parental control included in the television broadcasting wave. The RRT is obtained by the CPU 12 executing the RRT obtaining program 14E. The storage unit 14 functions as a rating table storage unit by storing the RRT data file 14B.

Moreover, for example, the RRT data file 14B stores a flag as rating table obtaining completion information which indicates that the RRT is obtained by the CPU 12 executing the RRT obtaining program 14E and is stored in the RRT data file 14B. The storage unit 14 functions as a completion information storage unit by storing the RRT data file 14B.

For example, the parental control data file 14C stores the parental control information which is input from the remote control R. In the television broadcasting receiving apparatus 100, the parental control is carried out based on the parental control information stored in the parental control data file 14C.

For example, the auto preset program 14D is a program to make the CPU 12 realize the function of orderly tuning the channels in which the video/audio data of the program is viewable by scanning the television broadcasting wave. Further, the auto preset program 14D is a program to make the CPU 12 realize the function of deleting the flag which is stored in the RRT data file 14B when the tuning by the auto preset is started. The CPU 12 functions as an auto preset unit by executing the auto preset program 14D.

For example, the RRT obtaining program 14E is a program to make the CPU 12 realize the function of storing the obtained RRT in the RRT data file 14B by obtaining the RRT which is included in the television broadcasting wave when the channels in which the video/audio data of the program is viewable are orderly tuned by the CPU 12 executing the auto preset program 14D.

More particularly, for example, the RRT obtaining program 14E is a program to make the CPU 12 realize the function of storing the obtained RRT in the RRT data file 14B by obtaining the RRT which is included in the television broadcasting wave only when it is determined that the flag is not stored in the RRT data file 14B by determining whether the flag is stored or not by referring to the RRT data file 14B when the channels in which the video/audio data of the program is viewable are orderly tuned by the CPU 12 executing the auto preset program 14D.

The CPU 12 functions as a rating table obtaining unit by executing the RRT obtaining program 14E.

For example, the display control program 14F is a program to make the CPU 12 realize the function of displaying the rating information based on the RRT which is obtained by the CPU 12 executing the RRT obtaining program 14E and which is stored in the RRT data file 14B on the display unit 9. The CPU 12 functions as a display control unit by executing the display control program 14F.

Figure 4A:
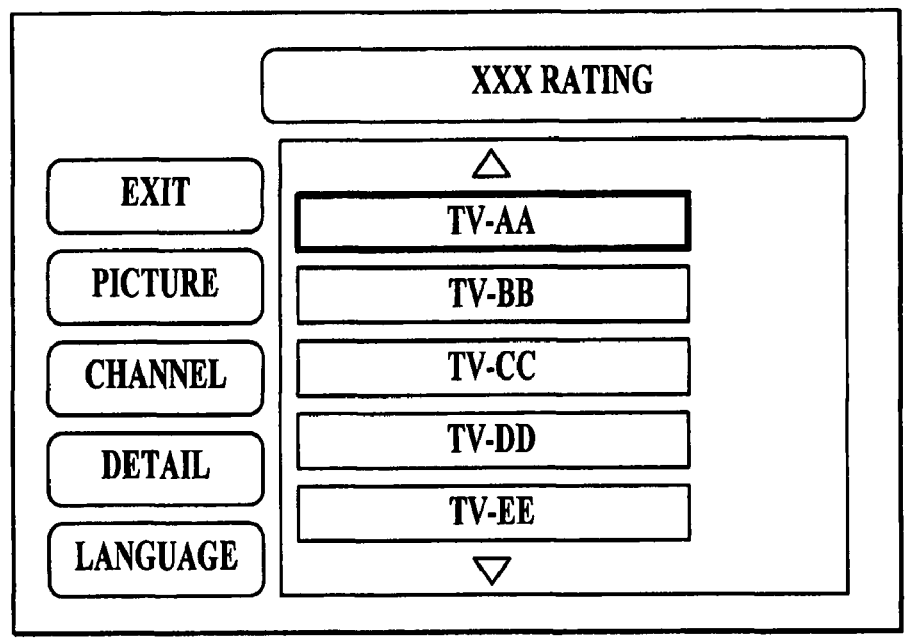
FIG. 4 is a diagram showing an example of rating information based on the RRT displayed on a display unit according to the present invention.

FIG. 4 shows an example of the rating information which is displayed on the display unit 9 by the CPU 12 executing the display control program 14F. In FIG. 4A, a RRT name of the RRT, rating items and various types of operation buttons are displayed. The rating items which carry out the parental control setting can be selected by selecting the desired rating items by pushing the arrow key (omitted from the drawing) of the remote control R in the display screen shown in FIG. 4A and pushing the decision key (omitted from the drawing).

Figure 4B:
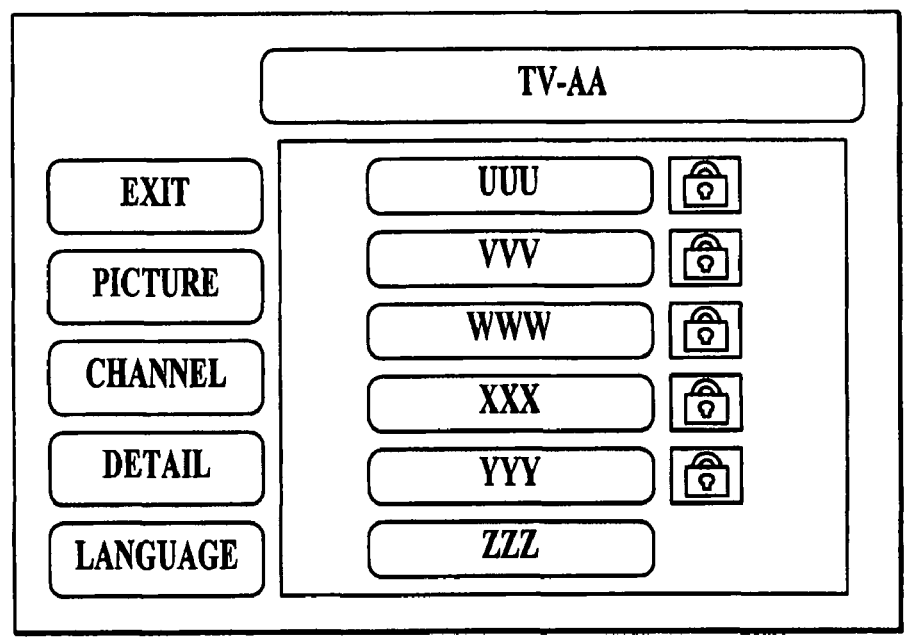

Concerning the display screen shown in FIG. 4A, when the operation signal which selects the rating items which carry out the parental control setting is input from the remote control R, the screen switches to the display screen shown in FIG. 4B, for example. In FIG. 4B, the name (for example, TV-AA: movie) of the rating item which is selected in FIG. 4A, the rating levels which can be set in the rating item and various types of operation buttons are displayed. For example, the rating level for carrying out the parental control can be selected by selecting the desired rating level by pushing an arrow key (omitted from the drawing) of the remote control R in the display screen shown in FIG. 4B and pushing the decision key (omitted from the drawing). Further, in the display screen shown in FIG. 4B, a key-hole mark is displayed besides the selected rating level, for example, when the operation signal to select the rating level for carrying out the parental control is input from the remote control R. Here, for example, because the block type of the rating item: TV-AA (for example, movie) selected in the FIG. 4A is the order method, the key-hole mark is displayed for all the rating levels which are higher than the rating level: YYY which is selected from the remote control R as the rating level for carrying out the parental control.

For example, the channel registration program 14G is a program to make the CPU 12 realize the function of storing the frequency and the channel number of the tuned channel in the tuning data file 14A by the CPU 12 executing the auto preset program 14D.

Figure 5:
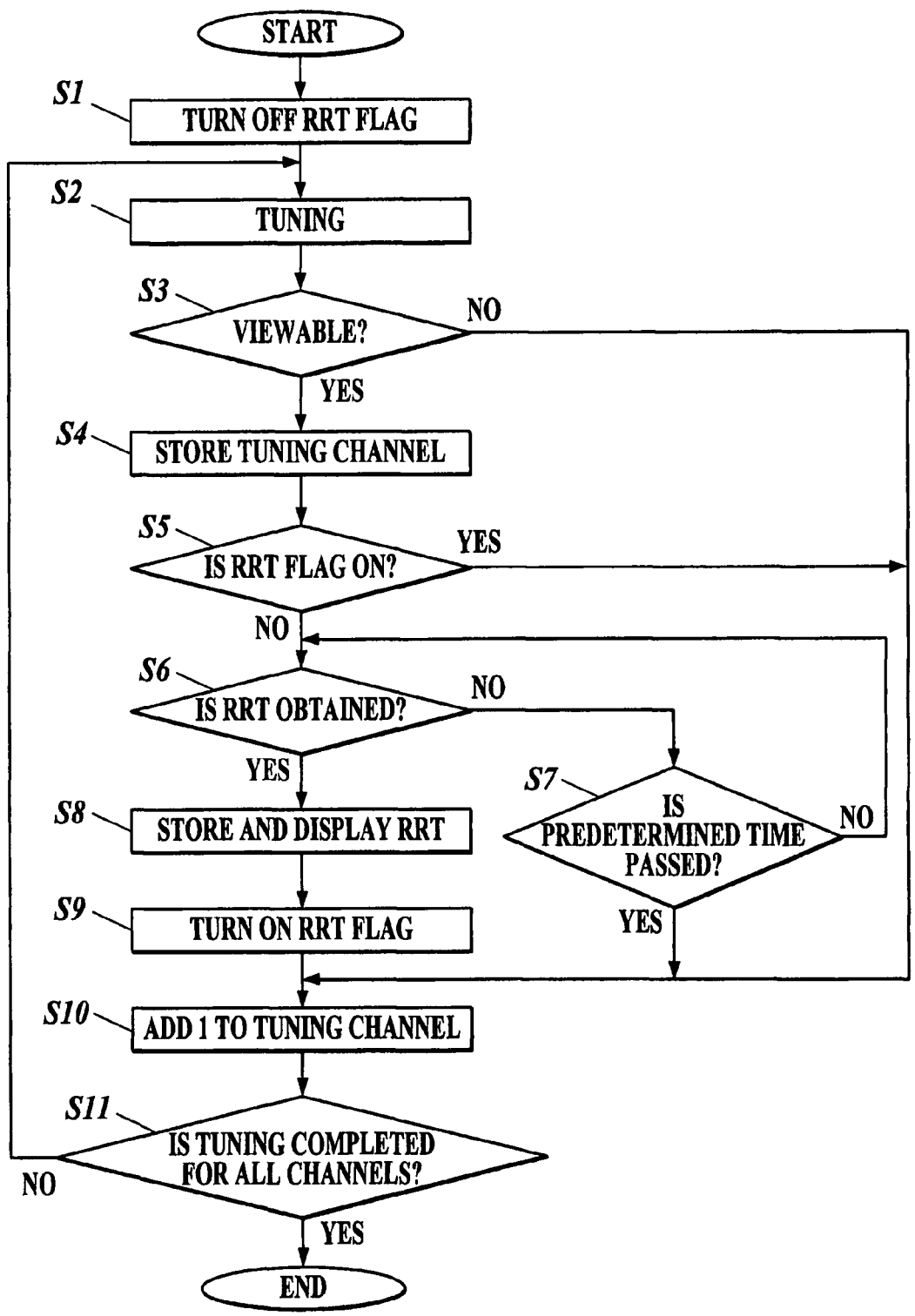
FIG. 5 is a flow chart explaining an example of an auto preset operation of the television broadcasting receiving apparatus according to the first embodiment of the present invention.

Next, the auto preset operation of the television broadcasting receiving apparatus look having the above described structure will be described with reference to the flow chart shown in FIG. 5.

First, when the operation signal to start the auto preset is input from the remote control R, the CPU 12 deletes the flag which is stored in the RRT data file 14B by the CPU 12 executing the auto preset program 14D (step S1).

Next, the CPU 12 starts the auto preset which orderly tunes the channels in which the video/audio data of the program is viewable by scanning the television broadcasting wave based on the execution of the auto preset program 14D by the CPU 12 (step S2).

Subsequently, the CPU 12 determines whether the television broadcasting signal is viewable or not by the CPU 12 determining whether the video/audio data can be generated or not from the television broadcasting signal of the tuned channel based on the execution of the auto preset program 14D by the CPU 12 (step S3).

When the CPU 12 determines that the television broadcasting signal of the tuned channel is not viewable in step S3 (step S3; No), the process proceeds to step S10.

When the CPU 12 determines that the television broadcasting signal of the tuned channel is viewable in step S3 (step S3; Yes), the CPU 12 stores the frequency and the channel number of the channel in the tuned data file 14A by the CPU 12 executing the channel registration program 14G (step S4).

Next, the CPU 12 determines whether the flag is stored or not by referring to the RRT data file 14B by the CPU 12 executing the RRT obtaining program 14E (step S5).

When the CPU 12 determines that the flag is stored in the RRT data file 14B in step S5 (step S5; Yes), the process proceeds to step S10.

When the CPU 12 determines that the flag is not stored in the RRT data file 14B in step S5 (step S5; No), the CPU 12 starts the detection of the RRT included in the television broadcasting wave and determines whether the RRT is obtained or not based on the execution of the RRT obtaining program 14E by the CPU 12 (step S6).

When the CPU 12 determines that the RRT is not obtained in step S6 (step S6; No), the CPU 12 determines whether a predetermined time has passed since the detection of the RRT is started based on the execution of the RRT obtaining program 14E by the CPU 12 (step S7).

When the CPU 12 determines that the predetermined time has not passed since the detection of the RRT is started in the step S7 (step S7; No), the process returns to step S6.

When the CPU 12 determines that the predetermined time has passed since the detection of the RRT is started in step S7 (step S7; Yes), the process proceeds to step S10.

When the CPU 12 determines that the RRT is obtained in step S6 (step S6; Yes), the obtained RRT is stored in the RRT data file 14B and the rating information based on the RRT is displayed by controlling the display unit 9 by the CPU 12 executing the display control program 14F (step S8).

Next, the CPU 12 stores the flag in the RRT data file 14B based on the execution of the RRT obtaining program 14E by the CPU 12 (step S9).

Subsequently, the CPU 12 adds 1 to the to-be-tuned channel number based on the execution of the auto preset program 14D by the CPU 12 (step S10).

Then, the CPU 12 determines whether the tuning of all the channels have completed or not, that is, whether the channel number reached the maximum channel number or not (step S11).

When the CPU 12 determines that the tuning of all the channels is not completer instep S11 (step S11; No), the process returns to step S2.

When the CPU 12 determines that the tuning of all the channels is completed in step S11 (step S11; Yes), the process is ended.

According to the television broadcasting receiving apparatus 100 of the above described first embodiment of the present invention, the television broadcasting wave is scanned and the channels in which the video/audio data of the program is viewable are orderly tuned by the CPU 12 executing the auto preset program 14D, the RRT included in the television broadcasting wave is obtained by the CPU 12 executing the RRT obtaining program 14E when the channels in which the video/audio data of the program is viewable are orderly tuned by the CPU 12 executing the auto preset program 14D, and the RRT which is obtained by the CPU 12 executing the RRT obtaining program 14E is stored by the RRT data file 14B. Therefore, the RRT is stored in advance and the parental control information can be set based on the RRT even when the program is viewed for the first time. Thus, the parental control information can be set more surely.

The RRT is obtained by the CPU 12 executing the RRT obtaining program 14E and the flag which indicates that the obtained RRT is stored in the RRT data file 14B is stored by the RRT data file 14B, and the CPU 12 obtains the RRT included in the television broadcasting wave and stores the obtained RRT in the RRT data file 14B by executing the RRT obtaining program 14E only when it is determined that the flag is not stored in the RRT data file 14B by determining whether the flag is stored in the RRT data file 14B or not when the channels including the video/audio data of the program are orderly tuned by the CPU 12 executing the auto preset program 14D. Therefore, it is efficient because the RRT is not needlessly obtained when the RRT is already stored.

Further, the rating information based on the RRT which is stored in the RRT data file 14B is displayed on the display unit 9 by the CPU 12 executing the display control program 14F, and the setting information which sets the parental control information based on the rating information which is displayed on the display unit 9 is input from the remote control R. Therefore, the rating information based on the RRT is displayed on the display unit 9 without a user operating in anyway when the RRT is obtained. Thus, the television broadcasting receiving apparatus is convenient to use because the parental control information can be set in the display.

Second Embodiment

Figure 6:
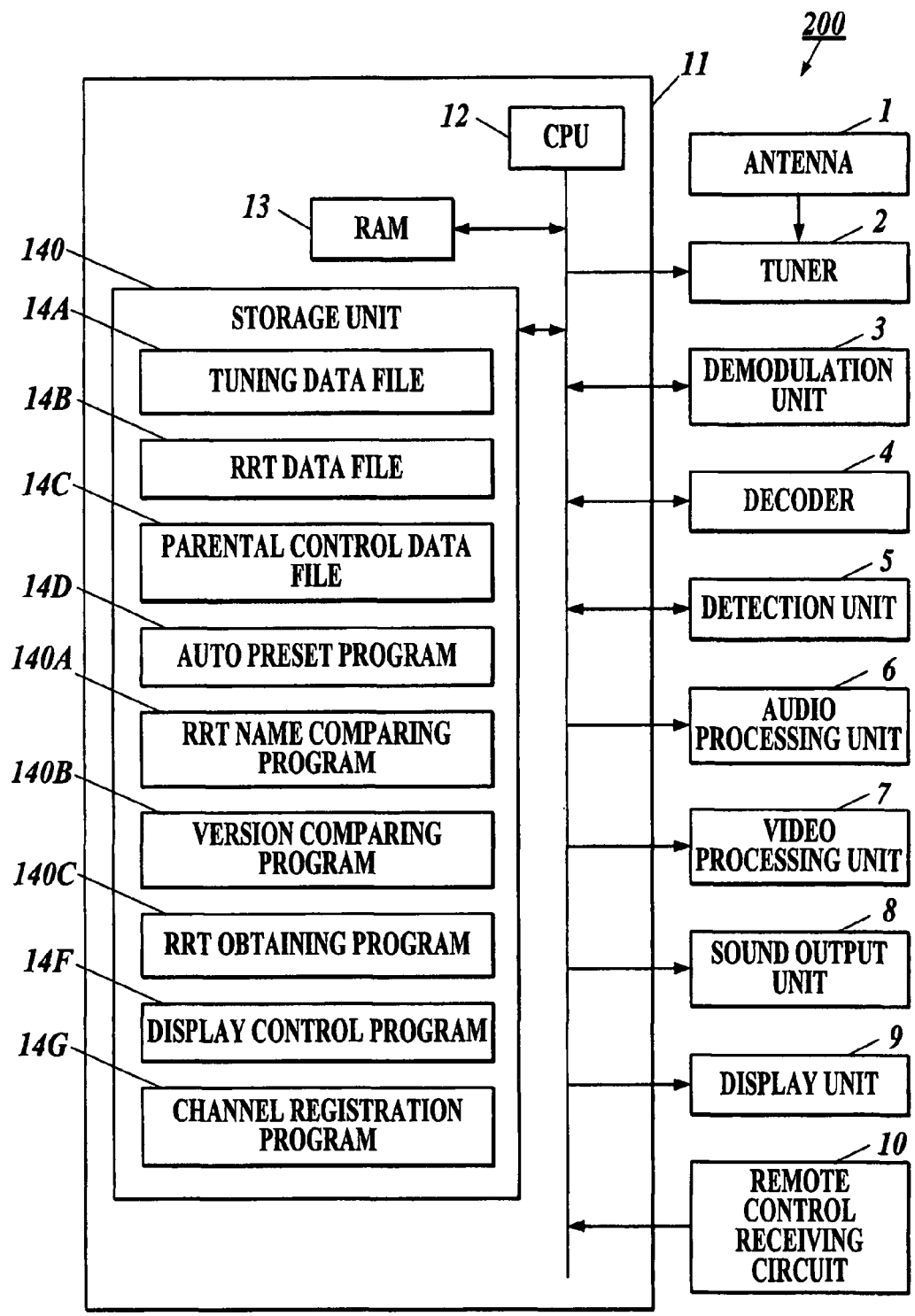
FIG. 6 is a block diagram showing a structure of the television broadcasting receiving apparatus according to the second embodiment of the present invention.

In a television broadcasting receiving apparatus 200 according to the second embodiment of the present invention, for example, only the structure of a storage unit 140 is different from the television broadcasting receiving apparatus 100 according to the first embodiment as shown in FIG. 6. Therefore, the same reference numerals are used for the same structures and the descriptions are omitted.

For example, the storage unit 140 comprises a recording medium (omitted from the drawing) in which programs, data, and the like are stored in advance, and for example, the recording medium is constituted of a semiconductor memory or the like. Further, the storage unit 140 stores various types of data and various types of processing programs to make the CPU 12 realize the function of controlling the entire television broadcasting receiving apparatus 200, the data and the like which are processed by the CPU 12 executing the programs. More particularly, for example, the storage unit 140 stores the tuning data file 14A, the RRT data file 14B, the parental control data file 14C, the auto preset program 14D, a RRT name comparing program 140A, a version comparing program 140B, a RRT obtaining program 140C, the display control program 14F, the channel registration program 14G and the like as shown in FIG. 6.

For example, the RRT name comparing program 140A is a program to make the CPU 12 realize the function of determining whether the RRT name of the obtained RRT and the RRT name stored in the RRT data file 14 match or not by the CPU 12 executing the RRT obtaining program 140C. The CPU 12 functions as a rating table name comparing unit by executing the RRT name comparing program 140A.

For example, the version comparing program 140B is a program to make the CPU 12 realize the function of determining whether the version of the RRT obtained by the RRT obtaining program 140C and the version of the RRT stored in the RRT data file 14B match or not when it is determined that the RRT name of the RRT obtained by the CPU 12 executing the RRT obtaining program 140C and the RRT name of the RRT stored in the RRT data file 14B by the CPU 12 executing the RRT name comparing program 140A. The CPU 12 functions as a version comparing unit by executing the version comparing program 140B.

For example, the RRT obtaining program 140C is a program to make the CPU 12 realize the function of obtaining the RRT included in the television broadcasting wave and storing the obtained RRT in the RRT data file 14B when the channels in which the video/audio data of the program is viewable are orderly tuned by the CPU 12 executing the auto preset program 14D.

More specifically, for example, the RRT obtaining program 140C obtains the RRT included in the television broadcasting wave when the channels in which the video/audio data of the program is viewable are orderly tuned by the CPU 12 executing the auto preset program 14D, and the RRT obtaining program 140C is a program to make the CPU 12 realize the function of storing the obtained RRT in the RRT data file 14B when it is determined that the RRT name of the obtained RRT is different from the RRT name of the RRT stored in the RRT data file 14B and when it is determined that the version of the obtained RRT and the version of the RRT stored in the RRT data file 14B do not match by the CPU 12 executing the RRT name comparing program 140A and the version comparing program 140B.

The CPU 12 functions as a rating table obtaining unit by executing the RRT obtaining program 140C.

Figure 7:
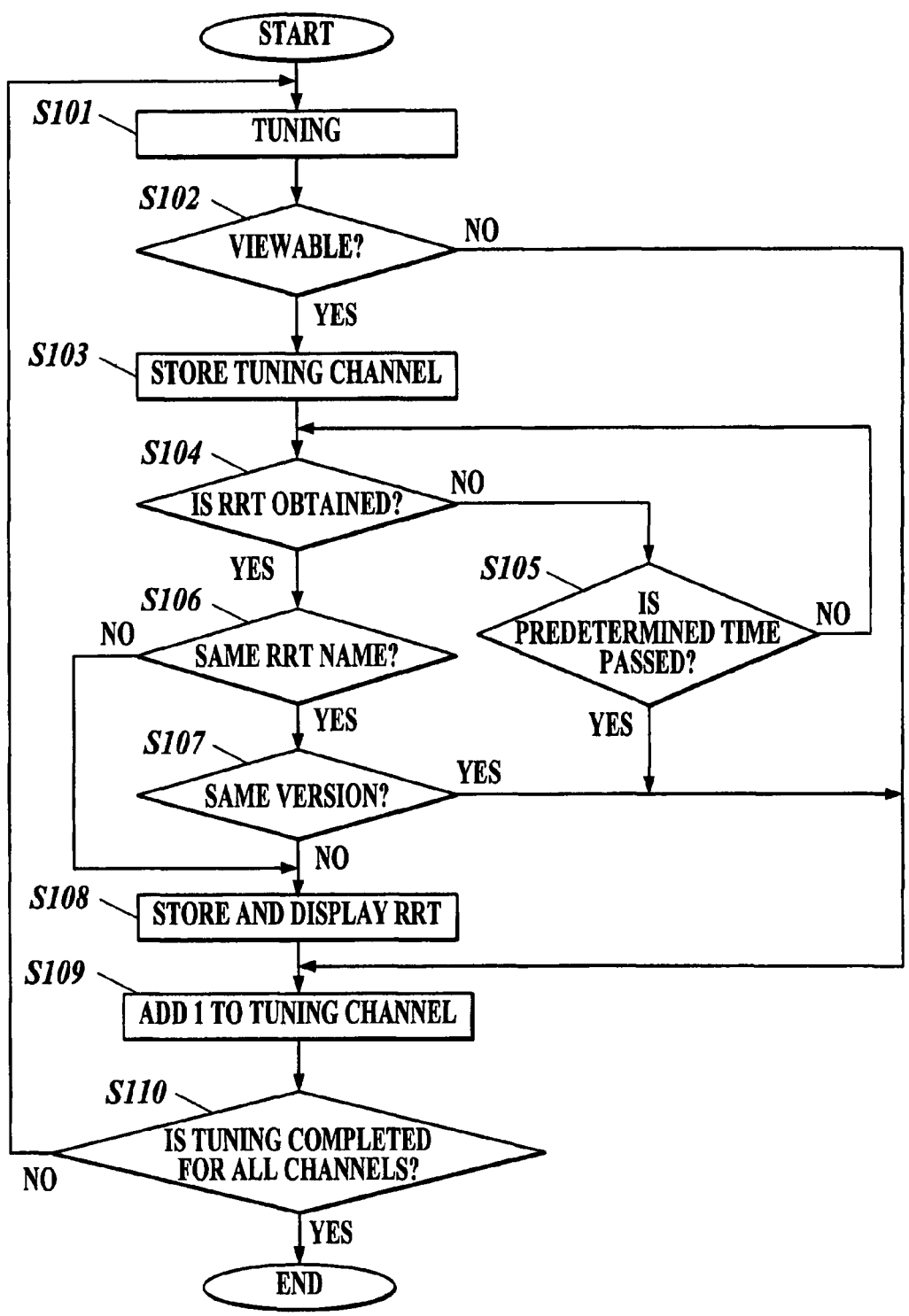
FIG. 7 is a flow chart explaining an example of the auto preset operation of the television broadcasting receiving apparatus according to the second embodiment of the present invention.

Next, an auto preset operation of the television broadcasting receiving apparatus 200 having the above described structure will be described with reference to the flow chart shown in FIG. 7.

First, when the operation signal to start the auto preset is input from the remote control R, the CPU 12 scans the television broadcasting wave and starts the auto preset which orderly tunes the channels in which the video/audio data of the program is viewable by the CPU 12 executing the auto preset program 14D (step S101).

Subsequently, the CPU 12 determines whether the television broadcasting signal is viewable or not by determining whether the video/audio data can be generated from the television broadcasting signal of the tuned channel based on the execution of the auto preset program 14D by the CPU 12 (step S102).

When the CPU 12 determines that the television broadcasting signal of the tuned channel is not viewable in step S102 (step S102; No), the process proceeds to step S109.

When the CPU 12 determines that the television broadcasting signal of the tuned channel is viewable in step S102 (step S102; Yes), the CPU 12 stores the frequency and the channel number of the channel in the tuning data file 14A by the CPU 12 executing the channel registration program 14G (step S103).

Then, the CPU 12 starts the detection of the RRT included in the television broadcasting wave and determined whether the RRT is obtained or not by the CPU 12 executing the RRT obtaining program 140C (step S104).

When the CPU 12 determines that the RRT is not obtained in step S104 (step S104; No), the CPU 12 determines whether a predetermined time has passed since the detection of the RRT is started or not based on the execution of the RRT obtaining program 140C by the CPU 12 (step S105).

When the CPU 12 determines that the predetermined time has not passed since the detection of the RRT is stared in step S105 (step S105; No), the process returns to step S104.

When the CPU 12 determines that the predetermined time has passed since the detection of the RRT is started in step S105 (step S105; Yes), the process proceeds to step S109.

When the CPU 12 determines that the RRT is obtained in step S104 (step S104; Yes), the CPU 12 determines whether the RRT name of the RRT obtained by the CPU executing the RRT obtaining program 140C and the RRT name of the RRT stored in the RRT data file 14B match or not by the CPU 12 executing the RRT name comparing program 140A (step S106).

When the CPU 12 determines that the RRT name of the RRT obtained by the CPU 12 executing the RRT obtaining program 140C and the RRT name of the RRT stored in the RRT data file 14B do not match (step S106; No), the process proceeds to S108.

When the CPU 12 determined that the RRT name of the RRT obtained by the CPU 12 executing the RRT obtaining program 140C and the RRT name of the RRT stored in the RRT data file 14B match in step S106 (step S106; Yes), the CPU 12 determines whether the version of the RRT obtained by the RRT obtaining program 140C and the version of the RRT stored in the RRT data file 14B match or not by the CPU 12 executing the version comparing program 140B (step S107).

When the CPU 12 determines that the version of the RRT obtained by the CPU 12 executing the RRT obtaining program 140C and the version of the RRT stored in the RRT data file 14B match in step S107 (step S107; Yes), the process proceeds to step S109.

When the CPU 12 determines that the version of the RRT obtained by the CPU 12 executing the RRT obtaining program 140C and the version of the RRT stored in the RRT data file 14B do not match in step S107 (step S107; No), the CPU 12 stores the obtained RRT in the RRT data file 14B based on the execution of the RRT obtaining program 140C by the CPU 12, and displays the rating information based on the RRT by controlling the display unit 9 by the CPU 12 executing the display control program 14F (step S108).

Next, the CPU 12 adds 1 to the channel number to be tuned based on the execution of the auto preset program 14D by the CPU 12 (step S109).

Then, the CPU 12 determines whether the tuning of all the channels is completed or not, that is, whether the channel number has reached the maximum channel number or not (step S110).

When the CPU 12 determines that the tuning of all the channels is not completed in step S110 (step S110; No), the process returns to step S101.

When the CPU 12 determined that the tuning of all the channels is completed in step S110 (step S110; Yes), the process is ended.

According to the television broadcasting receiving apparatus 200 of the above described second embodiment of the present invention, the television broadcasting wave is scanned and the channels in which the video/audio data of the program is viewable are orderly tuned by the CPU 12 executing the auto preset program 14D, the RRT included in the television broadcasting wave is obtained by the CPU 12 executing the RRT obtaining program 140C when the channels in which the video/audio data of the program is viewable are orderly tuned by the CPU 12 executing the auto preset program 14D, and the RRT obtained by the CPU 12 executing the RRT obtaining program 140C is stored by the RRT data file 14B. Therefore, the RRT is stored in advance and the parental control information can be set based on the RRT even when the program is viewed for the first time. Thus, the parental control information can be set more surely.

Further, the RRT name and the version of the RRT are stored so as to correspond to the RRT by the RRT data file 14B, it is determined whether the RRT name of the RRT obtained by the CPU 12 executing the RRT obtaining program 140C and the RRT name of the RRT stored in the RRT data file 14B match or not by the CPU 12 executing the RRT name comparing program 14, it is determined whether the version of the RRT obtained by the CPU 12 executing the RRT obtaining program 140C and the version of the RRT stored in the RRT data file 14B match or not by the CPU 12 executing the version comparing program 140B when it is determined that the RRT name of the RRT obtained by the CPU 12 executing the RRT obtaining program 140C and the RRT name of the RRT stored in the RRT data file 14B match by the CPU 12 executing the RRT name comparing program 140A, and the RRT included in the television broadcasting wave is obtained and is stored in the RRT data file 14B by the CPU 12 executing the RRT obtaining program 140C only when it is determined that the RRT name of the RRT obtained by the CPU 12 executing the RRT obtaining program 140C and the RRT name of the RRT stored in the RRT data file 14B do not match by the CPU 12 executing the RRT name comparing program 140A and when it is determined that the version of the RRT obtained by the CPU 12 executing the RRT obtaining program 140C and the version of the RRT stored in the RRT data file 14B do not match by the CPU 12 executing the version comparing program 140B. Therefore, whether the received RRT is already stored or not is determined based on the rating name and the version of the RRT, and the RRT data file 14B is not updated when the received RRT is already stored. Thus, the RRT data file 14B can be prevented from being needlessly updated.

Moreover, the rating information stored in the RRT data file 14B is displayed on the display unit 9 by the CPU 12 executing the display control program 14F, and the setting information to set the parental control information based on the rating information displayed on the display unit 9 is input from the remote control R. Therefore, the rating information based on the RRT is displayed on the display unit 9 without a user operating in anyway when the RRT is obtained. Thus, the television broadcasting receiving apparatus is convenient to use because the parental control information can be set in the display.

Here, the television broadcasting receiving apparatus of the present invention can be anything as long as it restricts the viewing and listening of the video and the audio based on the video/audio signal. For example, the television broadcasting receiving apparatus can be a broadcasting receiving apparatus such as a digital television, a set top box or the like.

According to a first aspect of the preferred embodiments of the present invention, there is provided a television broadcasting receiving apparatus which carries out a parental control based on rating information in a video/audio data included in a television broadcasting wave comprising a receiving unit to receive the television broadcasting wave, an auto preset unit to orderly tune channels in which a video/audio data of a program is viewable by scanning the television broadcasting wave, a rating table obtaining unit to obtain a rating table included in the television broadcasting wave when the channels in which the video/audio data of the program is viewable are orderly tuned by the auto preset unit, a rating table storage unit to store the rating table obtained by the rating table obtaining unit, a completion information storage unit to store rating table obtaining completion information which indicates that the rating table is obtained by the rating table obtaining unit and stored in the rating table storage unit, a display control unit to display rating information based on the rating table stored in the rating table storage unit on the display unit and an input unit to input setting information to set parental control information based on the rating information displayed on the display unit, and the rating table obtaining unit determines whether the rating table obtaining completion information is stored in the completion information storage unit or not when the channels including the video/audio data of the program are orderly tuned by the auto preset unit, and obtains the rating table included in the television broadcasting wave only when it is determined that the rating table obtaining completion information is not stored in the completion information storage unit.

In accordance with the first aspect of the preferred embodiments of the present invention, the television broadcasting wave is scanned and the channels in which the video/audio data of the program is viewable are orderly tuned by the auto preset unit, the rating table included in the television broadcasting wave is obtained by the rating table obtaining unit when the channel in which the video/audio data of the program is viewable are orderly tuned by the auto preset unit, and the rating table obtained by the rating table obtaining unit is stored by the rating table storage unit.

Therefore, the rating table is already store and the parental control information can be set based on the rating table even when the program is viewed for the first time. Thus, the parental control information can be set more surely.

Further, the rating table is obtained by the rating table obtaining unit and the rating table obtaining completion information which indicates that the rating table if stored in the rating table storage unit is stored by the completion information storage unit, and the rating table obtaining unit determines whether the rating table obtaining completion information is stored in the completion information storage unit or not when the channels which include the video/audio data of the program are orderly tuned by the auto preset unit, and obtains the rating table included in the television broadcasting wave and stores the obtained rating table in the rating table storage unit only when it is determined that the rating table obtaining completion information is not stored in the completion information storage unit. Therefore, it is efficient because the rating table is not obtained needlessly when the rating table is already stored in the rating table storage unit.

Furthermore, the rating information is displayed on the display unit based on the rating table stored in the rating table storage unit by the display control unit and the setting information to set the parental control information based on the rating information displayed on the display unit is input by the input unit. Therefore, the rating information based on the rating table is displayed on the display unit without a user operating in anyway when the rating table is obtained. Thus, the television broadcasting receiving apparatus is convenient to use because the parental control information can be set in the display.

According to a second aspect of the preferred embodiments of the present invention, there is provided a television broadcasting receiving apparatus which carries out a parental control based on rating information in a video/audio data included in a television broadcasting wave comprising a receiving unit to receive the television broadcasting wave, an auto preset unit to orderly tune channels in which a video/audio data of a program is viewable by scanning the television broadcasting wave, a rating table obtaining unit to obtain a rating table included in the television broadcasting wave when the channels in which the video/audio data of the program is viewable are orderly tuned by the auto preset unit and a rating table storage unit to store the rating table obtained by the rating table obtaining unit.

In accordance with the second aspect of the preferred embodiments of the present invention, the television broadcasting wave is scanned and the channels in which the video/audio data of the program is viewable are orderly tuned by the auto preset unit, the rating table included in the television broadcasting wave is obtained by the rating table obtaining unit when the channels in which the video/audio data of the program is viewable are orderly tuned by the auto preset unit, and the rating table obtained by the rating table obtaining unit is stored by the rating table storage unit. Therefore, the rating table is already stored and the parental control information can be set based on the rating table even when the program is viewed for the first time. Thus, the parental control information can be set more surely.

Preferably, the television broadcasting receiving apparatus further comprises a completion information storage unit to store rating table obtaining completion information which indicates that the rating table is obtained by the rating table obtaining unit and stored in the rating table storage unit, and the rating table obtaining unit determined whether the rating table obtaining completion information is stored in the completion information storage unit or not when the channels including the video/audio data of the program are orderly tuned by the auto preset unit, and obtains the rating table included in the television broadcasting wave and stores the rating table in the rating table storage unit only when it is determined that the rating table obtaining completion information is not stored in the completion information storage unit.

In the present invention, the same effect can be obtained. Specifically, the rating table is obtained by the rating table obtaining unit and the rating table obtaining completion information which indicates that the obtained rating table is stored in the rating table storage unit is stored by the completion information storage unit, and the rating table obtaining unit determines whether the rating table obtaining completion information is stored in the completion information storage unit or not when the channels which include the video/audio data of the program are orderly tuned by the auto preset unit and obtains the rating table included in the television broadcasting wave and stores the obtained rating table in the rating table storage unit only when it is determined that the rating table obtaining completion information is not stored in the completion information storage unit. Therefore, it is efficient because the rating table is not needlessly obtained when the rating table is already stored in the rating table storage unit.

Preferably, the television broadcasting receiving apparatus further comprises a rating table name comparing unit to determine whether a rating table name of the rating table obtained by the rating table obtaining unit and a rating table name of the rating table stored in the rating table storage unit match or not and a version comparing unit to determine whether a version of the rating table obtained by the rating table obtaining unit and a version of the rating table stored in the rating table storage unit math or not when it is determined that the rating table name of the rating table obtained by the rating table obtaining unit and the rating table name of the rating table stored in the rating table stored unit match by the rating table name comparing unit, and the rating table storage unit stored the rating table name and the version of the rating table so as to correspond to the rating table, and the rating table obtaining unit obtains the rating table included in the television broadcasting wave and stores the rating table in the rating table storage unit only when the rating table name of the rating table obtained by the rating table obtaining unit and the rating table name of the rating table stored in the rating table storage unit do not match by the rating table name comparing unit and it is determined that the version of the rating table obtained by the rating table obtaining unit and the version of the rating table stored in the rating table storage unit do not match by the version comparing unit.

In the present invention, the same affect can be obtained. Specifically, the rating table name and the version of the rating table are stored so as to correspond to the rating table by the rating table storage unit, it is determined whether the rating table name of the rating table obtained by the rating table obtaining unit and the rating table named of the rating table stored in the rating table storage unit match or not by the rating table name comparing unit, it is determined whether the version of the rating table obtained by the rating table obtaining unit and the version of the rating table stored in the rating table storage unit match or not by the version comparing unit when it is determined that the rating table name of the rating table obtained by the rating table obtaining unit and the rating table name of the rating table stored in the rating table storage unit match by the rating table name comparing unit, and the rating table included in the television broadcasting wave is obtained and the obtained rating table is stored in the rating table storage unit by the rating table obtaining unit only when it is determined that the rating table name of the rating table obtained by the rating table obtaining unit and the rating table name of the rating table stored in the rating table storage unit do not match by the rating table name comparing unit and when it is determined that the version of the rating table obtained by the rating table obtaining unit and the version of the rating table stored in the rating table storage unit do not match by the version comparing unit. Therefore, whether the received rating table is already stored in the rating table storage unit or not is determined based on the rating name and the version of the rating table, and the rating table storage unit is not updated when the received rating table is already stored. Thus, the rating table storage unit can be prevented from being updated needlessly.

Preferably, the television broadcasting receiving apparatus further comprises a display control unit to display rating information based on the rating table stored in the rating table storage unit on the display unit and an input unit to input setting information to set parental control information based on the rating information displayed on the display unit.

In the present invention, the same effect can be obtained. Specifically, the rating information is displayed on the display unit based on the rating table stored in the rating table storage unit by the display control unit and the setting information to set the parental control information based on the rating information displayed on the display unit is input by the input unit. Therefore, the rating information is displayed on the display unit based on the rating table without a user operating in anyway when the rating table is obtained. Thus, the television broadcasting receiving apparatus is convenient to use because the parental control information can be set in the display.

The entire disclosure of Japanese Patent Application No. 2006-291382 filed on Oct. 26, 2006 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A television broadcasting receiving apparatus which carries out a parental control based on rating information in a video/audio data included in a television broadcasting wave, comprising:

a receiving unit to receive the television broadcasting wave;

an auto preset unit to orderly tune channels in which a video/audio data of a program is viewable by scanning the television broadcasting wave;

a rating table obtaining unit to obtain a rating table included in the television broadcasting wave when the channels in which the video/audio data of the program is viewable are orderly tuned by the auto preset unit;

a rating table storage unit to store the rating table obtained by the rating table obtaining unit;

a completion information storage unit to store a rating table obtaining completion information flag which indicates that the rating table has already been obtained by the rating table obtaining unit and stored in the rating table storage unit;

a display control unit to display rating information based on the rating table stored in the rating table storage unit on the display unit; and an input unit to input setting information to set parental control information based on the rating information displayed on the display unit, wherein the rating table obtaining unit is configured to determine whether the rating table obtaining completion information flag is already stored in the completion information storage unit or not when the channels including the video/audio data of the program are orderly tuned by the auto preset unit, and obtains the rating table included in the television broadcasting wave only when it is determined that the rating table obtaining completion information flag is not already stored in the completion information storage unit; and the auto preset unit deletes the rating table obtaining completion information flag which is stored in the completion information storage unit when starting to scan the television broadcasting wave.

2. A television broadcasting receiving apparatus which carries out a parental control based on rating information in a video/audio data included in a television broadcasting wave, comprising:

a receiving unit to receive the television broadcasting wave;

an auto preset unit to orderly tune channels in which a video/audio data of a program is viewable by scanning the television broadcasting wave;

a rating table obtaining unit to obtain a rating table included in the television broadcasting wave when the channels in which the video/audio data of the program is viewable are orderly tuned by the auto preset unit;

a rating table storage unit to store the rating table obtained by the rating table obtaining unit; and a completion information storage unit to store a rating table obtaining completion information flag which indicates that the rating table has already been obtained by the rating table obtaining unit and stored in the rating table storage unit, wherein the rating table obtaining unit is configured to determine whether the rating table obtaining completion information flag is already stored in the completion information storage unit or not when the channels including the video/audio data of the program are orderly tuned by the auto preset unit, and obtains the rating table included in the television broadcasting wave and stores the rating table in the rating table storage unit only when it is determined that the rating table obtaining completion information flag is not already stored in the completion information storage unit; and the auto preset unit deletes the rating table obtaining completion information flag which is stored in the completion information storage unit when starting to scan the television broadcasting wave.

3. The television broadcasting receiving apparatus as claimed in claim 2, further comprising:

a rating table name comparing unit to determine whether a rating table name of the rating table obtained by the rating table obtaining unit and a rating table name of the rating table stored in the rating table storage unit match or not; and a version comparing unit to determine whether a version of the rating table obtained by the rating table obtaining unit and a version of the rating table stored in the rating table storage unit match or not when it is determined that the rating table name of the rating table obtained by the rating table obtaining unit and the rating table name of the rating table stored in the rating table storage unit match by the rating table name comparing unit, wherein the rating table storage unit stores the rating table name and the version of the rating table so as to correspond to the rating table, and the rating table obtaining unit obtains the rating table included in the television broadcasting wave and stores the rating table in the rating table storage unit only when it is determined that the rating table name of the rating table obtained by the rating table obtaining unit and the rating table name of the rating table stored in the rating table storage unit do not match by the rating table name comparing unit and it is determined that the version of the rating table obtained by the rating table obtaining unit and the version of the rating table stored in the rating table storage unit do not match by the version comparing unit.

4. The television broadcasting receiving apparatus as claimed in claim 2, further comprises:

a display control unit to display rating information based on the rating table stored in the rating table storage unit on the display unit; and an input unit to input setting information to set parental control information based on the rating information displayed on the display unit.

* * * * *